United States Patent [19]

Okamura

[11] Patent Number: 4,668,960
[45] Date of Patent: May 26, 1987

[54] RECORDING APPARATUS WITH DUAL-PURPOSE GUIDE

[75] Inventor: Shigeru Okamura, Kawasaki, Japan

[73] Assignee: Canon Kabushiki Kaisha, Tokyo, Japan

[21] Appl. No.: 644,518

[22] Filed: Aug. 27, 1984

[30] Foreign Application Priority Data

Sep. 2, 1983 [JP] Japan .................. 58-160297

[51] Int. Cl.⁴ .............. G01D 9/00; G01D 15/24; B41J 13/10
[52] U.S. Cl. .................. 346/24; 346/136; 400/605; 400/621; 400/642
[58] Field of Search .............. 346/24, 134, 136; 400/621, 621.1, 621.2, 603.1, 623, 642, 605

[56] References Cited

U.S. PATENT DOCUMENTS

| | | | |
|---|---|---|---|
| 2,241,357 | 5/1941 | Paschke | 400/621 |
| 2,360,591 | 10/1944 | Sim | 400/621 |
| 2,671,710 | 3/1954 | Bowditch | 346/24 |
| 2,961,287 | 11/1960 | Zabriskie et al. | 346/24 X |
| 3,746,444 | 7/1973 | Kahle et al. | 346/24 U X |
| 4,079,646 | 3/1978 | Morishita | 83/349 |
| 4,090,205 | 5/1978 | Huffman et al. | 346/136 X |
| 4,234,261 | 11/1980 | Hendrischk et al. | 400/605 X |
| 4,395,118 | 7/1983 | Komori et al. | 355/75 |
| 4,451,167 | 5/1984 | Honma et al. | 346/24 X |
| 4,452,543 | 6/1984 | Adkisson et al. | 400/605 |
| 4,483,635 | 11/1984 | Wisner et al. | 400/642 |
| 4,504,161 | 3/1985 | Volke et al. | 400/605 |

FOREIGN PATENT DOCUMENTS

| | | | |
|---|---|---|---|
| 2717758 | 10/1978 | Fed. Rep. of Germany | 400/605 |
| 59-78875 | 5/1984 | Japan | 400/605 |
| 437922 | 11/1935 | United Kingdom | 400/603.1 |

Primary Examiner—George H. Miller, Jr.
Attorney, Agent, or Firm—Fitzpatrick, Cella, Harper & Scinto

[57] ABSTRACT

A recording apparatus comprises recording means for effecting recording on one surface of a recording medium, means for feeding the recording medium, a housing for containing the recording means and the feeding means therein, and means provided at a position whereat it is discharged outwardly from the housing when the recording medium is fed by the feeding means, the means being for guiding the recording medium in a predetermined direction and guiding the recording medium so that on one surface of the recording medium, the means can contact only the widthwise end portions of the recording medium.

11 Claims, 4 Drawing Figures

RECORDING APPARATUS WITH DUAL-PURPOSE GUIDE

BACKGROUND OF THE INVENTION

1. Field of the Invention

This invention relates to a recording apparatus in which recording paper after recording is guided in a predetermined direction.

2. Description of the Prior Art

In recent years, in recording apparatuses, it has been required that recording be effected satisfactorily even on recording paper sheets of different thicknesses or different materials. For example, in recent years, many requirements have been imposed so that information on a color cathode ray tube can be recorded on recording paper for an OHP (the abbreviation for overhead projector) by an ink jet printer and this can be projected.

However, if recording is effected on recording paper for an OHP by an ink jet printer, the ink drying time after recording will be long and during movement of the recording paper for an OHP, a cutter located at the discharge port for the OHP recording paper or a paper keeping roller or the like on a platen which serves as a guide may come into contact with the recording paper and may stain the recording surface with ink.

SUMMARY OF THE INVENTION

It is an object of the present invention to provide a recording apparatus which can satisfactorily effect appropriate recording on different recording mediums.

It is another object of the present invention to enable fixation of recording to be effected reliably and stably.

It is still another object of the present invention to use a recording paper cutter also as a guide for the recording medium.

It is yet still another object of the present invention to effect the optimum feeding of the recording medium in accordance with the rigidity of the recording medium.

Other objects of the present invention will become apparent from the following detailed description taken in conjunction with the accompanying drawings.

DESCRIPTION OF THE PREFERRED EMBODIMENT

Figure 1:
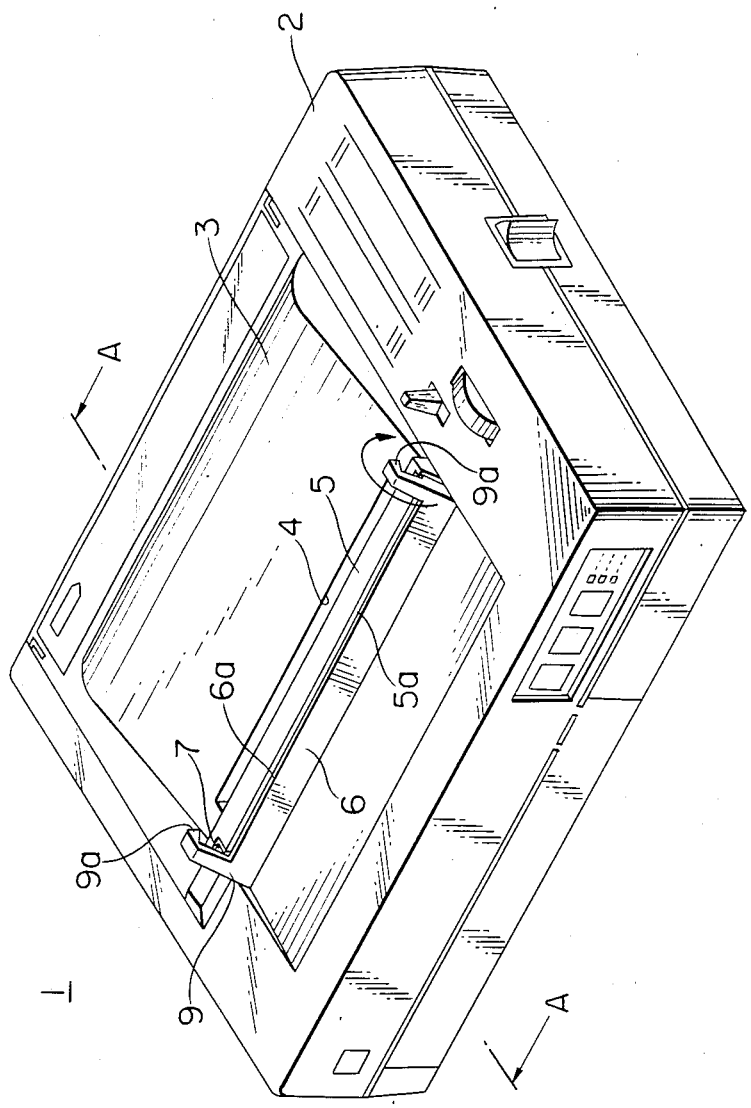
FIG. 1 is a perspective view of an ink jet printer as it is effecting recording on plain paper.

The invention will hereinafter be described in detail with respect to an embodiment thereof shown in the drawings.

Referring to FIGS. 1-4 which illustrate an embodiment of the present invention, an ink jet printer generally designated by reference numeral 1 has a housing 2. An openable and closable cover 3 is provided on a part of the upper surface of the housing 2 and a roll of recording paper, not shown, is contained in the housing with the cover 3 in its open state.

An insertion port 4 into which cut sheets may be inserted is provided at a part of the free end side of the cover 3.

An outlet guide 5 is provided on the upper surface of the housing 2 in juxtaposed relationship with the insertion port 4, and a cutter 6 is provided on this side of the outlet guide 5. In other words, this cutter 6 is disposed at a position which is the discharge direction side of the recording medium with respect to an ink jet recording head 16 and a paper feeding roller 11 which will later be described and in which the recording medium is discharged outwardly from the housing, and serves also as a guide for guiding the thus fed recording medium in a predetermined direction and discharging the recording medium outwardly of the housing 2.

The cutter 6 has a length substantially equal to the length of the outlet guide 5 and is pivotably mounted on the opposite ends of the outlet guide 5 through an arms 7 provided at the lengthwisely opposite ends of the cutter, by means of a shaft 8.

Also, support arms 9 are provided at the opposite ends of the cutter 6 in juxtaposed relationship with the arms 7, and the end of each of these support arms 9 is bent so as to provide an engaging portion 9a engageable with the outlet guide 5 in the fashion of click.

The end portion of the cutter 6 which is adjacent to the outlet guide 5 provides a toothed portion 6a opposed to the outlet guide 5.

Figure 2:
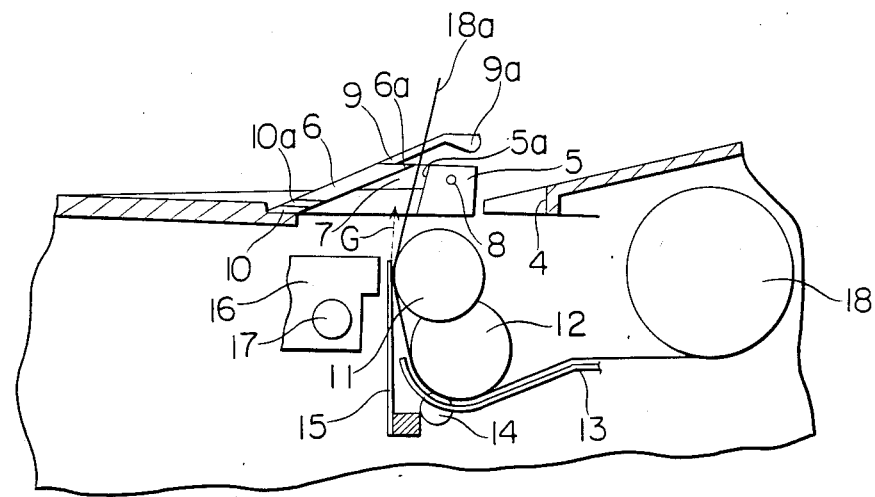
FIG. 2 is a fragmentary enlarged cross-sectional view taken along line A—A of FIG. 1.
Figure 3:
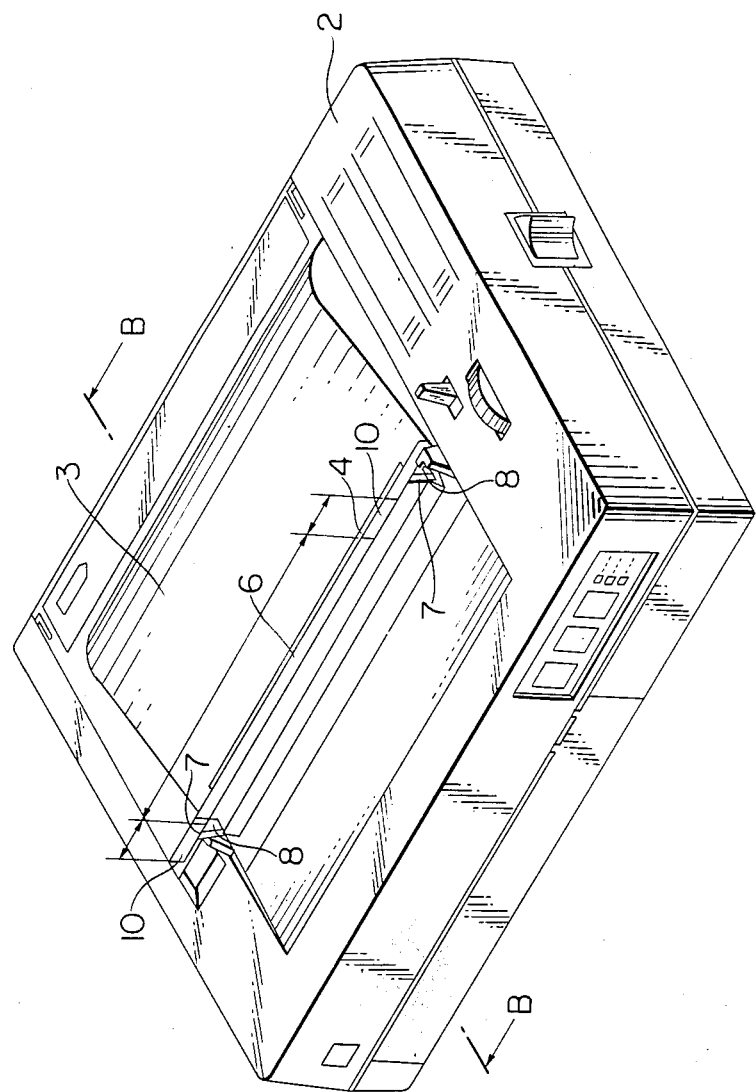
FIG. 3 is a perspective view of an ink jet printer as it is effecting recording on recording paper for an OHP.

At the opposite end portions of the cutter 6, bent pieces 10 are projectedly provided in a predetermined spaced apart, parallel relationship with the cutter 6, as shown in FIGS. 2 and 3, and a cut-away 10a is formed between each of the bent pieces 10 and the end of the cutter 6.

On the other hand, within the ink jet printer 1, as shown in FIG. 2, paper feeding rollers 11 and 12 are provided below the insertion port 4, a paper guide 13 is disposed below the paper feeding roller 12, and a pinch roller 14 contacting the paper roller 12 through the paper guide 13 is provided.

Reference numeral 15 designates a paper keeping plate, the upper end of which is in contact with the overlying paper feeding roller 11, which serves also as a platen and discharges the recording medium in the upward direction G. An ink jet recording head for discharging ink and recording images is provided on this side of the paper feeding roller 11 for movement relative to a guide bar 17.

In FIG. 2, reference numeral 18 designates a roll of plain paper.

Operation of the present invention constructed as described above will now be described.

Description will first be made of the recording using the roll of plain paper 18 of low rigidity.

The leading end portion 18a of the plain paper unwound from the roll 18 is guided between the paper feeding roller 12 and the pinch roller 14 along the paper guide 13 and is directed outwardly along the outlet guide 5 with its opposite side edges urged against the paper feeding roller 11 by the paper keeping plate 15.

During the recording on this plain paper, the cutter 6 is pivoted counter-clockwise about the shaft 8 as shown in FIGS. 1 and 2, and the end portion of the cutter 6 which is adjacent to the bent piece 10 is stopped while being in contact with the housing 2.

In this state, a gap 5a is formed between the toothed portion 6a of the cutter 6 and the outlet guide 5 and, through this gap 5a, the end portion 18a of the roll of recording paper 18 is directed out in a direction intersecting the original feed direction G as shown.

In this state, ink is discharged from an ink jet nozzle, not shown, with movement of the ink jet recording head 16, whereby recording is effected on one surface of the recording paper.

When recording is effected over a predetermined length, the leading end portion 18a of the roll of recording paper 18 is bent so as to be urged against the toothed portion 6a of the cutter 6 and the recording paper is cut by utilization of the toothed portion 6a.

During the recording on the plain paper, the ink is almost completely dry by the time that the recording paper has reached the toothed portion 6a and therefore, even if the printed surface of the recording paper comes into contact with the toothed portion 6a, the recording paper will never be stained by the ink.

Now, the recording on recording paper for OHP, which is high in rigidity and low in affinity for the ink is effected in the following manner.

First, the cutter 6 is pivoted clockwise about the shaft 8 as viewed in the Figure from the recording state with respect to the plain paper shown in FIG. 1.

Figure 4:
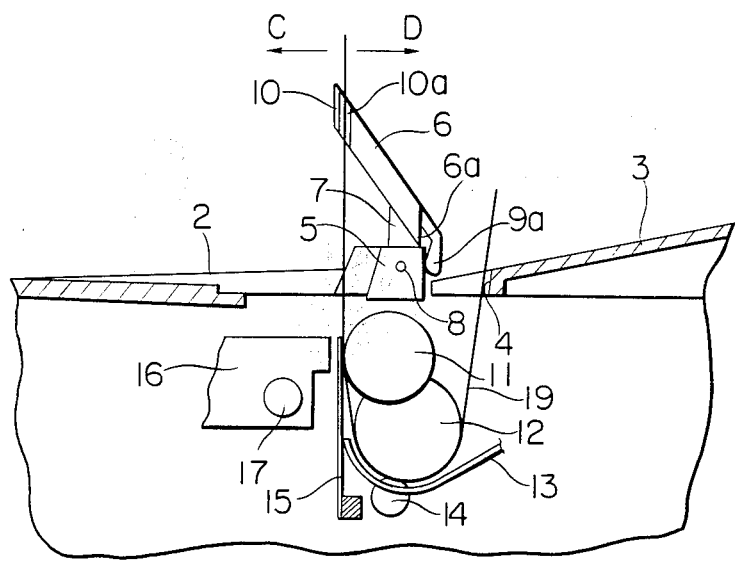
FIG. 4 is a fragmentary enlarged cross-sectional view taken along line B—B of FIG. 3.

Thereupon, the engaging portion 9a of the arm 9 of the cutter 6 comes into contact with the outlet guide 5 as shown in FIG. 4 and this portion is resiliently deformed to hold the cutter 6 resiliently at this position.

At the same time, the cut-away portion 10a between the bent piece 10 adjacent to the free end of the cutter 6 and the cutter 6 becomes positioned upwardly.

In this state, the recording paper 19 for OHP in the form of a cut sheet of strong rigidity is inserted from the insertion port 4, is directed out along the paper feeding rollers 11 and 12 and is set at the recording position.

In this state, recording is effected and the recording paper 19 for OHP is fed out upwardly little by little, but since the recording paper 19 for OHP is formed of a synthetic resin film or the like, it has considerable rigidity and is fed out in the direction G while keeping its stretched state, and soon the leading end thereof fits into the cut-away portion 10a.

In the cut-away portion 10a, the recording surface of the recording paper 19 for OHP may only contact the bent piece 10 at the widthwise opposite ends and these end portions are blank and thus, they never contact the recorded images. Even if in this state, the recording paper 19 for OHP is fed out, it does not contact the images and is not stained by ink.

As shown in FIG. 4, the cut-away portion 10a guides the recording paper 19 for OHP in a direction substantially equal to the direction G, and even if the recording paper falls on the side of the direction of arrow D, there occurs no contact between the recording surface and the cutter 6 and thus, there is no hindrance.

Also, when the recording paper 19 for OHP falls in a direction indicated by arrow C, there is the possibility of the recording surface thereof contacting the housing 2, but if the recording paper 19 for OHP is of A4 size which is most often used, it never happens that the recording paper for OHP after having left the cut-away portion 10a contacts the housing 2.

Also, in most cases, the recording paper 19 for OHP is usually endowed with a nature of being curled so that the recording surface thereof becomes convex and therefore, there is no possibility of the recording paper falling in the direction of arrow D to stain the recording surface thereof.

The present invention is not restricted to the above-described embodiment, but it permits the use of not only the recording paper for OHP but also, for example, plain paper having its surface coated with synthetic resin or plain paper impregnated with silicon or the like.

I claim:

1. A recording apparatus for recording an image on a recording sheet, comprising:
   recording means for image-recording;
   guide means for guiding to a recording station of said recording means a first recording sheet and a second recording sheet different in kind from the first recording sheet; and
   means capable of taking a first position and a second position, said means in said first position being capable of contacting an image-formed area of the first recording sheet discharged after the image is recorded thereon by said recording means to the said first recording sheet, said means in said second position being capable of contacting only the side edge portions on an image-recorded surface of the second recording sheet discharged after the image is recorded thereon by said recording means to guide the second recording sheet.

2. An apparatus according to claim 1, wherein the first recording sheet is a plain paper.

3. An apparatus according to claim 1, wherein the second recording sheet has a low affinity for a recording material.

4. An apparatus according to claim 1, wherein the second recording sheet is an overhead-projector recording sheet.

5. An apparatus according to claim 1, wherein said last-mentioned means is disposed at a sheet discharge position.

6. An apparatus according to claim 1, wherein said last-mentioned means comprises a sheet cutting portion capable of contacting the image-formed area of the first recording sheet.

7. An apparatus according to claim 1, wherein both side edge portions of the second recording sheet are non-image areas.

8. An apparatus according to claim 1, wherein said recording means includes a recording head for ejecting ink onto the recording sheet.

9. A recording apparatus for recording an image on a recording sheet by recording means, comprising:
   first guide means for guiding a web-like recording sheet to a recording position of said recording means,
   second guide means for guiding a cut recording sheet to said recording position of the recording means; and
   means having a cutting portion for cutting the web-like recording sheet having been recorded on by the recording means and a guide portion for guiding the cut recording sheet having been recorded on, said means being capable of assuming a first condition wherein said cutting portion is disposed downstream with respect to the sheet conveyance and adjacent to a conveyance path of the web-like recording sheet and a second condition where said guide portion is positioned adjacent to a conveyance path of the cut recording sheet.

10. An apparatus according to claims 9, wherein said first guide means and said second guide means include common elements.

11. An apparatus according to claim 9, wherein said recording means includes a recording head for ejecting ink onto the recording sheet.

* * * * *